(No Model.)
L. GREEN.
TWO WHEELED VEHICLE.
No. 281,994.   Patented July 24, 1883.
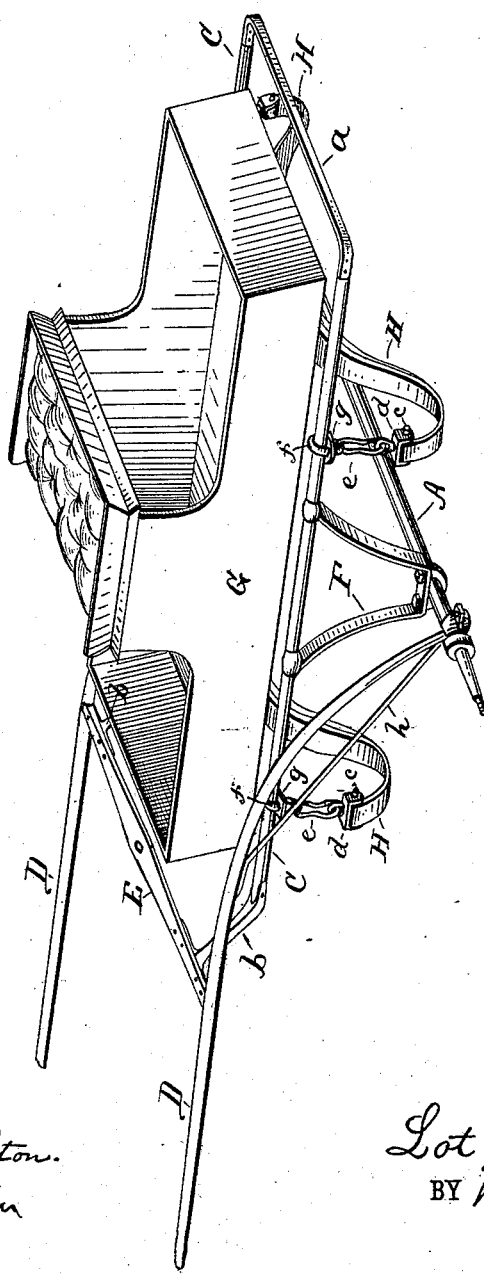
WITNESSES:
Thos. Houghton.
Edw. H. Byrn
INVENTOR:
Lot Green
BY Munn & Co
ATTORNEYS.

UNITED STATES PATENT OFFICE.

LOT GREEN, OF RUSHVILLE, INDIANA.

TWO-WHEELED VEHICLE.

SPECIFICATION forming part of Letters Patent No. 281,994, dated July 24, 1883.

Application filed January 12, 1883. (No model.)

*To all whom it may concern:*

Be it known that I, LOT GREEN, of Rushville, in the county of Rush and State of Indiana, have invented a new and useful Improvement in Road-Carts; and I do hereby declare that the following is a full, clear, and exact description of the same, reference being had to the accompanying drawing, forming part of this specification, in which the figure is a perspective view.

My invention relates to an improvement in two-wheeled vehicles or road-carts; and its object is to relieve the body and seat of the cart from the sudden jerking motion produced by the walk or trot of the horse when the side bar is solidly fastened to the frame of the shafts.

In the drawing, A represents the axle, upon which revolve the supporting-wheels, and C are the side bars, which are dropped a little below the level of the shafts D, and are connected in the rear of the cart-body by a cross-piece, $a$, while at their front ends they are fastened to a downward extension, $b$, from the cross-bar E of the shafts which support the single-tree. These side bars are supported upon the single axle A by means of bracket-irons F, which are securely fastened to the top of the axle, and are bolted or otherwise fastened to the bottom of the side bars. The cart-body G is arranged inside the side bars, and is sustained upon transverse springs H H, one of which is in front and the other in rear of the axle. These springs are of the form shown, and are attached to the bottom of the cart-body, and thence curve downwardly and upwardly again to a point beneath the side bars. Here they are suspended from the side bars by a bolt, $c$, passing through shackle $d$, a link, $e$, and a clip, $f$ $g$, one portion of which clip, $f$, passes over the side bar, while the other portion, $g$, is fastened on to the pendent stems of $f$ by means of nuts, and has an eye, to which the upper end of the link $e$ is fastened.

The shafts D, it will be seen, are connected directly to the axle and the cross-piece E, and are provided with a suitable brace, $h$.

By means of the construction thus described, it will be seen that although the shafts and side bars are connected together and oscillate about the axle as a center from the movement of the horse, the body of the cart, by reason of its suspension upon the springs and loose shackle-connections, is relieved of this motion, and riding is rendered easier and pleasant, as the shackle-connection permits perfect freedom of movement in all directions.

Having thus described my invention, what I claim as new is—

The combination of the single axle A, the side bars, C, with intermediate inelastic supports, F, the shafts D, connected to the axle and to the cross-bar E, the downwardly-extending arms $b$, having side bars, C, fastened thereto, the cart-body, and the subjacent springs attached to said body and suspended from the side bars by shackles, as described.

LOT GREEN.

Witnesses:
EDWARD C. CHARLES,
WESLEY S. MORRIS.